3,064,038
Patented Nov. 13, 1962

1

3,064,038
PROCESS FOR PREPARING SODIUM
ACETYLSALICYLATE
Ernest C. Adams, Jr., Elkhart, Ind., assignor to Miles
Laboratories, Inc., Elkhart, Ind., a corporation of
Indiana
No Drawing. Filed Mar. 9, 1959, Ser. No. 797,855
6 Claims. (Cl. 260—480)

This invention relates to analgesic compositions and processes for their preparation. Particularly the invention relates to pharmaceutical compositions having analgetic properties. More particularly the invention relates to an improved process for the preparation of the sodium salt of acetylsalicylic acid and the compositions so prepared.

Salts of acetylsalicylic acid (aspirin) are well known and described in the art of pharmaceutical compositions. The analgetic properties of acetylsalicylic acid and its derivatives have been utilized by the medical profession for many years. However, so far as we are aware, there has never been a successful process for the preparation of the sodium salt of acetylsalicylic acid due to its instability under many conditions and its extremely high solubility in water. Consequently, this compound is relatively unknown among the family of the salts of aspirin.

It has now been discovered and forms the object of this invention that a solution of sodium acetylsalicylate which is prepared by the careful neutralization of a slurry of acetylsalicylic acid in water with a solution of a desired basic material such as sodium carbonate, sodium bicarbonate, sodium hydroxide and the like may be treated by a rapid removal of water while maintaining the solution at low temperatures so as to yield substantially pure crystalline sodium acetylsalicylate. This new and improved process has been found to yield over 95% of the theoretical amount of sodium acetylsalicylate of a purity of from about 99.2 to 99.8%.

Briefly stated, the process comprises the steps of forming a water slurry of acetylsalicylic acid in chemically pure cold water (20° C. or less) neutralizing this acid solution with a desired base and rapidly removing the water while maintaining the solution at a low temperature.

The base, such as sodium bicarbonate, sodium carbonate, sodium hydroxide, etc., in the form of a water solution, a suspension in water or other solvent, or as a finely divided solid, is carefully added to the cold slurry of the acetylsalicylic acid. Optimum results are obtained if the base is added so that the pH of the mixture is maintained between about 6.0 and 7.0. When using strong bases care must be taken so that there are no spots in the mixture of localized high pH for it has been found that at pH levels above about 7.0, hydrolysis of the salt to sodium salicylate occurs. At pH levels below about 6.0 incomplete neutralization has been found to result.

The key to the improved process of this invention lies in the manner in which the water is removed from the solution of sodium acetylsalicylate. The solution must be maintained at a pH within the range of from about 6.0 to 7.0. This necessitates the careful admixing of the slurry of the acid and the base. It is essential that the water be removed rapidly and at a low temperature. The temperature of the solution should not rise above about 10° C. during this step of the process and it is preferred that it not rise above about 0° C. At these temperatures the water is preferably removed by vacuum distillation and while an operable vacuum is one of about 5,000 microns of mercury, a vacuum of below about 500 microns of mercury is preferred. It is to be under-

2 stood, of course, that the lower limits of temperature and pressures are dictated only by practical considerations and by equipment limitations and a perfect vacuum are optimum.

As will be pointed out below, lyophilization of the solution of sodium acetylsalicylate has proven to be an efficient way of accomplishing the desired results. In this procedure temperatures of about −25° to −10° C. and pressures of about 150 to 250 microns of mercury have been used.

The sodium acetylsalicylate prepared in accordance with the process described above has been found to have superior and outstanding properties of increasing the rate and amount of salicylate levels in the blood of both animals and human beings as will be shown below. The compound may be blended with usual pharmaceutical excipients such as talc, lactose, fuller's earth, calcium carbonate, magnesium carbonate, calcium sulfate, dicalcium sulphate, and the like in dosage unit form. If desired it may be tabletted in accordance with procedures known to the art or it may be placed in capsules or administered in the form of water solutions. Dosage units of from about 1 to 10 grains (65–640 mg.) are useful.

A very useful dosage unit form comprises from 1 to 10 grains of sodium acetylsalicylate together with a sufficient amount of an effervescent couple to insure rapid disintegration in the stomach or gastro-intestinal tract. The preferred form of the effervescent couple is a mixture of equimolar parts of citric acid and sodium bicarbonate. However, other well known mixtures of acids and bases may be used, for example organic acids such as tartaric acid, malonic acid, fumaric acid, itaconic acid, glutamic acid, succinic acid, etc. with bases such as alkali metal carbonates or bicarbonates.

The invention will be more clearly explained by referring to the following illustrative examples:

EXAMPLE I 50.4 grams of sodium bicarbonate were dissolved in 300 ml. of hot water and the solution was cooled to room temperature. This gave a solution of sodium bicarbonate which contained additional sodium bicarbonate in a fine suspension.

108 grams of acetylsalicylic acid were suspended in 324 ml. of water. The suspension was prepared by first forming a paste with the acid and a small amount of the water and then slowly adding the balance of the water with stirring.

The sodium bicarbonate was slowly added with stirring to the aspirin suspension. When the solution was complete, the pH was adjusted to 6.0 to 6.4 by dropwise addition of 1 N sodium hydroxide. The solution was then poured into 6 centrifuge bottles (250 ml.) and shell frozen. The frozen solution was then lyophilized for from 24 to 48 hours. There was obtained 115 grams of sodium acetylsalicylate which represented 95% of the theoretical yield (121.2 gms.). Assay proved the material to be 99.2 to 99.6% pure sodium acetylsalicylate.

The sodium acetylsalicylate prepared in accordance with Example I was compounded into a pharmaceutical composition having the following formula:

|  | mg. |
|---|---|
| Sodium acetylsalicylate | 364.0 |
| Sodium bicarbonate | 56.7 |
| Citric acid | 43.2 |

This composition was tabletted and exhibited outstanding properties of stability demonstrating no breakdown for periods in excess of 9 months when protected from moisture.

EXAMPLE II

A solution of sodium acetylsalicylate prepared as described in Example I above was submitted to stability tests by holding at various temperatures. At stated time internals the samples were tested for the breakdown product, free sodium salicylate. Results of these stability tests are set out in Table I below:

*Table I*

PERCENT FREE SODIUM SALICYLATE

[Stability Tests]

| Time (hrs) | .25 | .5 | 1 | 2 | 3 | 5 | 6 | 8 |
|---|---|---|---|---|---|---|---|---|
| Temp., °C.: | | | | | | | | |
| 7 | .2 | .2 | .2 | .2 | .2 | .3 | .4 | .5 |
| 22 | .2 | .4 | .5 | .7 | .9 | 1.4 | 1.6 | 2.1 |
| 38 | .3 | .6 | 1.3 | 2.5 | | 7.4 | | 12.5 |

EXAMPLE III

In order to demonstrate the rate of absorption of the compound of the invention and to compare the absorption rate with that of aspirin and with that of a commercially available product containing aspirin and an effervescent couple, the following experiments were run.

A group of healthy dogs were given the compounds orally at levels of 89 and 300 milligrams per kilogram. At stated time intervals blood samples were taken from the animals and the serum separated therefrom. One-half milliliter of the serum thus obtained was transferred into each of two colorimeter tubes. To the "blank" tubes there was added 5 milliliter of a solution prepared by diluting 4.5 milliliter of concentrated nitric acid to a volume of 1 liter, taking 50 milliliter of this solution and diluting to 90 milliliter with distilled water. To the "color" tube there was added 5 milliliter of a solution of 1 gram of ferric nitrate heating. However, the recovery of added free salicylate or acetylsalicylate was reasonably good despite the change in optical density values. Five milligrams of free or conjugated salicylate per 100 milliliter of serum were usually recovered with an accuracy of 90% or better.

Set out in Table II and Table III below are the data obtained in accordance with the above procedure.

*Table II*

[mg. salicylate/100 ml. serum. Dosage: 300 mg./kg.]

| Time (hrs) | .25 | .50 | 2 | 6 |
|---|---|---|---|---|
| Aspirin | 12 | 30 | 56 | 42 |
| Comp X [1] | 5 | 12 | 24 | 21 |
| Sodium acetylsalicylate | 12 | 38 | 58 | 47 |

[1] A commercially available effervescent analgesic containing aspirin, calcium phosphate, magnesium oxide, and an effervescent couple.

*Table III*

[mg. salicylate/100 ml serum. Dosage: 89 mg./kg.]

| Time (hrs) | .25 | .50 | 2 | 6 |
|---|---|---|---|---|
| Aspirin | 6 | 13 | 15 | 16 |
| Comp X [1] | 8 | 18 | 17 | 9 |
| Sodium acetylsalicylate | 8 | 18 | 22 | 16 |

[1] See footnote 1, Table II.

{Fe(NO$_3$)$_3$·9H$_2$O} in 100 mililiter of 0.07 N nitric acid which was diluted 5 to 9 with distilled water. After thoroughly mixing, the optical density of the "color" tube was read at 530 milimicrons using the "blank" tube to set the spectrophotometer (Coleman Model 14) at 100% transmission. This procedure was carried out with serum samples obtained prior to administration of the drug (fasting serum) and a serum standard prepared separately for each subject by diluting an aqueous solution of sodium salicylate containing 116 mg. per 100 mililiter (equivalent to 100 mg. of salicylic acid per 100 mililiter) 1 to 20 with serum obtained from the subject prior to administration of the drug. A determination on fasting serum was necessary since all serum contains minute amounts of unidentified substances which gives a color with ferric nitrate. The optical density of the fasting serum was used as a correction factor for both the serum standard and for serum samples after administration of the drug. The calculation of results was carried out using the following formula:

Free Saliclyate (mg. salicylic acid per 100 ml. of serum) =

$$\frac{\text{O.D. Serum Sample} - \text{O.D. Fasting Serum}}{\text{O.D. Serum Standard} - \text{O.D. Fasting Serum}} \times \text{Conc. Std.}$$

The final solutions used to determine free salicylate (the "blank" tubes containing 0.5 ml. serum plus 5 ml. Reagent Plank Solution and the "color" tubes containing 0.5 ml. serum plus 5 ml. Salicylate Reagent Solutions) were heated for 10 minutes in a boiling water bath at 100° C. This hydrolyzed any conjugated salicylate (e.g. acetylsalicylate) to free salicylate which then reacted with iron to give the characteristic purple color. After cooling, the "color" tubes were again read in the spectrophotometer at 530 millimicrons, setting each corresponding "blank" tube at 100% transmission. Total salicylate calculations were made by substituting in the above formula the optical density values obtained after heating.

In all instances the optical density of all tubes increased as a result of

EXAMPLE IV

A group of healthy rats were orally given various dosage levels of aspirin, a commercial composition and the compound of this invention. The blood serum levels of salicylic acid were determined at the indicated time intervals in a manner similar to that described in connection with Example II above. The data obtained are set out in Table IV below:

*Table IV*

[mg. salicylic acid/100 ml. serum]

| Dosage (as aspirin) | Aspirin | Comp X [1] | Sodium acetyl-salicylate |
|---|---|---|---|
| 30 mg./kg.: | | | |
| 10 min | 6 | 10 | 10 |
| 30 min | 7 | 10 | 12 |
| 100 mg./kg.: | | | |
| 10 min | 10 | 12 | 13 |
| 30 min | 12 | 20 | 22 |
| 300 mg./kg.: | | | |
| 10 min | 18 | 27 | 46 |
| 30 min | 35 | 38 | 48 |
| 600 mg./kg.: | | | |
| 10 min | 25 | 40 | 50 |
| 30 min | 35 | 44 | 60 |
| 900 mg./kg.: | | | |
| 10 min | 36 | 40 | 50 |
| 30 min | 39 | 50 | 75 |
| 1200 mg./kg.: | | | |
| 10 min | 37 | 39 | 60 |
| 30 min | 42 | 75 | 107 |

[1] See footnote 1, Table II.

EXAMPLE V

Tablets prepared as described in connection with Example I above (Compound A) were administered orally in a number of human subjects and plasma total salicylate levels at the expiration of stated time intervals were obtained. The method used was that described by Brodie, Uderfrieds, and Coburn in the Journal of Pharmacology and Experimental Therapy, volume 80, 1944 at pages 114–117. Comparative data were obtained on aspirin, the commercial preparation referred to above, and a composition (Compound B) prepared by tabletting 324 milligrams of acetylsalicylic acid with 207.7 milligrams of sodium bicarbonate and 43.2 milligrams of citric acid.

The results of these experiments are set out in Table V below:

Table V

| Preparation | Method of ingestion | Number of subjects | Plasma total salicylate, mg. per liter | | | | |
|---|---|---|---|---|---|---|---|
| | | | 10 min. | 20 min. | 30 min. | 45 min. | 60 min. |
| Aspirin | Suspended in water. | 15 | 13 | 22 | 30 | 35 | 40 |
| Comp X | Dissolved in water. | 20 | 28 | 46 | 50 | 53 | 52 |
| Compound A [1] | Tablets | 15 | 25 | 45 | 56 | 57 | 56 |
| Compound B [2] | ---do--- | 15 | 20 | 40 | 46 | 47 | 47 |

[1] Compound A: Sodium acetylsalicylate, 364.0 mg.; sodium bicarbonate, 56.7 mg.; citric acid, 43.2 mg.
[2] Compound B: Acetylsalicylic acid, 324.0 mg.; sodium bicarbonate, 207.7 mg.; citric acid, 43.2 mg.

The data presented above clearly demonstrates the fact that higher salicylate blood levels are obtained more quickly with a compound of this invention than with any of the other compounds tested. This improved rate of absorption represents an advance in the art of analgetic preparations that is surprising and unexpected. A further advantage of the compound of this invention may be found in the fact that this form of acetylsalicylate, in contrast to the ordinary aspirin, is non-irritating to the gastric mucosa even at large dose levels. For example, when administered to humans in dosage levels of about 10 grains t.i.d., there was no subjective or objective evidence of any undesirable side effects.

To reiterate briefly, the present invention relates to improved pharmaceutical preparations based on the active ingredient sodium acetylsalicylate and to an improved process for the preparation of this salt. The process comprises the steps of preparing a solution of sodium acetylsalicylate by neutralizing a water slurry of acetylsalicylic acid with the desired base and rapidly removing water at low temperatures. The preferred embodiment of the inventive process comprises removing, at a temperature below 10° C. and at a reduced pressure below about 5,000 microns of mercury, the water from a solution of sodium acetylsalicylate having a pH within the range of from 6.0 to 7.0, said solution having been prepared by neutralizing a water slurry of acetylsalicylic acid with an equivalent of sodium bicarbonate. Pharmaceutical compositions comprising sodium acetylsalicylate have been found to be surprisingly non-irritating to gastro-intestinal mucosa and are particularly efficacious for the rapid obtention of high blood salicylate levels. Compositions comprising sodium acetylsalicylate and an effervescent couple are particularly desirable.

What is claimed is:

1. A process for the preparation of the sodium salt of acetylsalicylic acid which comprises the steps of neutralizing a water slurry of acetylsalicylic acid with sodium bicarbonate, maintaining the pH of the neutralized mixture within the range of 6.0 to 7.0 and rapidly removing the water from said mixture while maintaining the temperature below about 10° C.

2. A process for the preparation of the sodium salt of acetylsalicylic acid which comprises the steps of neutralizing a water slurry of acetylsalicylic acid with a solution of sodium bicarbonate, maintaining the pH of the mixture within the range of 6.0 and 7.0, and rapidly removing the water from said mixture under a vacuum of below about 5,000 microns of mercury, the temperature of the mixture during said water removal being maintained below 10° C.

3. A process for the preparation of the sodium salt of acetylsalicylic acid which comprises slurrying acetylsalicylic acid in hot water, cooling said slurry to room temperature, neutralizing said cooled slurry with a solution of sodium bicarbonate in such a fashion that the pH of the mixture remains in the range of 6.0 to 7.0, and rapidly removing the water from said neutralized solution at a temperature below about 0° C. and at a pressure below about 500 microns of mercury.

4. A process according to claim 3 wherein said water is removed from said neutral solution at a temperature of about —10° to —25° C. and at a pressure of about 150 to 250 microns of mercury.

5. A process according to claim 3 wherein said water is removed from said neutral solution by lyophilization.

6. A process for the preparation of the sodium salt of acetylsalicylic acid which comprises the steps of neutralizing a water slurry of acetylsalicylic acid with a solution of sodium bicarbonate, maintaining the pH of the mixture within the range of 6.0 and 7.0 and rapidly removing the water from said mixture under a vacuum below about 500 microns of mercury and at a temperature below about 0° C.

References Cited in the file of this patent

UNITED STATES PATENTS

| | | |
|---|---|---|
| 740,702 | Seifert et al. | Oct. 6, 1903 |
| 1,764,933 | Coplans | June 17, 1930 |
| 1,993,743 | Miller | Mar. 12, 1935 |
| 2,003,374 | Lawrence | June 9, 1935 |
| 2,134,714 | Glassman | Nov. 1, 1938 |
| 2,447,396 | Coplans | Aug. 17, 1948 |
| 2,687,366 | Seifter | Aug. 24, 1954 |
| 2,731,492 | Kamlet | Jan. 17, 1956 |
| 2,890,240 | Hamer et al. | June 9, 1959 |

UNITED STATES PATENT OFFICE
CERTIFICATE OF CORRECTION

Patent No. 3,064,038                      November 13, 1962

Ernest C. Adams, Jr.

It is hereby certified that error appears in the above numbered patent requiring correction and that the said Letters Patent should read as corrected below.

Column 3, line 35, beginning with "heating. However, the recovery" strike out all to and including "Table II." in line 63, same column 3, and insert the same after "of" in column 4, line 30.

Signed and sealed this 21st day of December 1965.

(SEAL)
Attest:

ERNEST W. SWIDER
Attesting Officer

EDWARD J. BRENNER
Commissioner of Patents